United States Patent
Daigle et al.

(10) Patent No.: US 8,988,016 B2
(45) Date of Patent: Mar. 24, 2015

(54) SYSTEM AND METHOD FOR TRACTION MOTOR CONTROL

(71) Applicant: General Electric Company, Schenectady, NY (US)

(72) Inventors: Jeffrey Louis Daigle, Erie, PA (US); Jeremy McGarry, Erie, PA (US)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 13/632,320

(22) Filed: Oct. 1, 2012

(65) Prior Publication Data

US 2013/0082626 A1    Apr. 4, 2013

Related U.S. Application Data

(60) Provisional application No. 61/542,796, filed on Oct. 3, 2011.

(51) Int. Cl.
| | |
|---|---|
| *H02P 5/00* | (2006.01) |
| *B61C 15/08* | (2006.01) |
| *B60L 3/10* | (2006.01) |
| *B60L 11/08* | (2006.01) |
| *B60L 15/20* | (2006.01) |

(52) U.S. Cl.
CPC ............... *B60L 11/08* (2013.01); *B60L 3/102* (2013.01); *B60L 3/104* (2013.01); *B60L 15/2063* (2013.01); *B60L 2200/26* (2013.01); *B60L 2220/46* (2013.01); *B60L 2240/12* (2013.01); *B60L 2240/421* (2013.01); *B60L 2240/423* (2013.01); *B60L 2240/429* (2013.01); *B60L 2240/461* (2013.01); *B60L 2240/463* (2013.01); *B60L 2240/465* (2013.01); *B60L 2260/28* (2013.01); *Y02T 10/642* (2013.01); *Y02T 10/70* (2013.01); *Y02T 10/7077* (2013.01); *Y02T 10/7275* (2013.01)
USPC ............. 318/52; 318/430; 318/434; 318/375; 318/802

(58) Field of Classification Search
USPC .................... 318/52, 430, 434, 375, 802, 803
See application file for complete search history.

(56) References Cited

U.S. PATENT DOCUMENTS

| | | | | |
|---|---|---|---|---|
| 3,659,187 | A | * | 4/1972 | Lamorlette ..................... 322/26 |
| 3,982,164 | A | | 9/1976 | de Buhr et al. |
| 3,997,822 | A | | 12/1976 | Logston, Jr. et al. |
| 4,023,083 | A | * | 5/1977 | Plunkett ........................ 318/802 |
| 4,039,914 | A | * | 8/1977 | Steigerwald et al. ......... 318/375 |

(Continued)

FOREIGN PATENT DOCUMENTS

| | | |
|---|---|---|
| EP | 1393951 A2 | 3/2004 |
| WO | 2005079504 A2 | 9/2005 |

OTHER PUBLICATIONS

Search Report and Written Opinion from corresponding PCT Application No. PCT/US2812/858452 dated Aug. 22, 2013.

*Primary Examiner* — Paul Ip
(74) *Attorney, Agent, or Firm* — GE Global Patent Operation; John A. Kramer (57) ABSTRACT

A control method comprises determining wheel creep of a wheel operably coupled to a traction motor and limiting a rate of change of an excitation frequency applied to the traction motor to drive the wheel, based on the determined wheel creep. According to one aspect, the rate of change of the excitation frequency is limited if the wheel creep exceeds a wheel creep threshold.

23 Claims, 8 Drawing Sheets

(56) References Cited

U.S. PATENT DOCUMENTS

| | | | | |
|---|---|---|---|---|
| 4,044,285 A | * | 8/1977 | Plunkett et al. | 318/803 |
| 4,075,538 A | * | 2/1978 | Plunkett | 318/52 |
| 4,088,934 A | * | 5/1978 | D'Atre et al. | 318/802 |
| 4,215,304 A | * | 7/1980 | D'Atre et al. | 318/758 |
| 4,215,305 A | * | 7/1980 | D'Atre et al. | 318/803 |
| 4,227,138 A | * | 10/1980 | Espelage et al. | 318/802 |
| 4,243,927 A | * | 1/1981 | D'Atre | 318/803 |
| 4,292,531 A | * | 9/1981 | Williamson | 290/14 |
| 4,463,289 A | | 7/1984 | Young | |
| 5,289,093 A | | 2/1994 | Jobard | |
| 5,480,220 A | * | 1/1996 | Kumar | 303/151 |
| 5,661,378 A | * | 8/1997 | Hapeman | 318/52 |
| 5,841,254 A | * | 11/1998 | Balch et al. | 318/430 |
| 5,998,880 A | * | 12/1999 | Kumar | 290/40 B |
| 6,104,148 A | * | 8/2000 | Kumar et al. | 318/52 |
| 6,163,121 A | * | 12/2000 | Kumar et al. | 318/434 |
| 6,194,850 B1 | * | 2/2001 | Kumar et al. | 318/52 |
| 6,274,998 B1 | | 8/2001 | Kaneko et al. | |
| 6,532,405 B1 | * | 3/2003 | Kumar et al. | 701/19 |
| 6,634,303 B1 | | 10/2003 | Madsen et al. | |
| 7,285,926 B2 | * | 10/2007 | McGarry et al. | 318/52 |
| 2003/0160586 A1 | | 8/2003 | Donnelly et al. | |
| 2007/0001629 A1 | * | 1/2007 | McGarry et al. | 318/52 |
| 2012/0098261 A1 | * | 4/2012 | Rozman et al. | 290/31 |

* cited by examiner

SYSTEM AND METHOD FOR TRACTION MOTOR CONTROL

CROSS-REFERENCE TO RELATED APPLICATIONS

This application claims priority to U.S. Provisional Application Ser. No. 61/542,796, filed Oct. 3, 2011, and incorporated by reference herein.

FIELD

Embodiments of the inventive subject matter described herein relate to motor control. Other embodiments relate to traction motor control in a vehicle.

BACKGROUND

Certain rail vehicles (e.g., locomotives) and other off-highway vehicles are powered by electric traction motors coupled in driving relationship to one or more axles of the vehicle. In a motoring mode of operation, the traction motors are supplied with electric current from a controllable source of electric power such as an engine-driven traction alternator. The traction motors apply torque to the vehicle wheels, which in turn exert tangential force (tractive effort) on the surface on which the vehicle is traveling, e.g., the parallel steel rails of a railroad track, and thereby propel the vehicle in a desired direction along a route of travel. In another instance, in a dynamic braking mode of operation, the motors serve as axle-driven electrical generators. In this mode of operation, the traction motors exert torque in an opposite direction from the rolling direction of the wheels, thereby slowing the vehicle's motion. In either case, good adhesion between each wheel and the surface facilitates efficient operation of the vehicle.

Maximum tractive effort or braking effort is obtained if each powered wheel of the vehicle is rotating at such an angular velocity that its actual peripheral speed (e.g., wheel speed) is slightly higher (in case of motoring) or slightly lower (in case of braking) than the actual speed of the vehicle. The difference between the linear speed at which the vehicle is traveling (referred to as ground speed) and wheel speed is referred to as slip speed, creep, or wheel creep. There is usually a relatively low limit on the value of slip speed at which peak tractive effort or braking effort is realized. This value, commonly known as optimum creep, is a variable that depends on ground speed and travel surface conditions. Operation of any or all wheels away from the optimum creep, e.g., at too small a creep value or too large a creep value, may result in a reduction or loss of wheel-to-surface adhesion. Likewise, if the wheel-to-surface adhesion tends to be reduced or lost, some or all the vehicle wheels may slip excessively, i.e., the actual slip speed or creep may be greater than the optimum creep. Such a wheel slip condition, which is characterized in the motoring mode by one or more slipping axle-wheel sets and in the braking mode by one or more sliding or skidding axle-wheel sets, can cause accelerated wheel wear, rail damage, high mechanical stresses in the drive components of the propulsion system, and an undesirable decrease of tractive (or braking) effort.

Wheel creep may be controlled using creep regulators. However, especially at low speeds, creep regulators have an increasingly more difficult time regulating wheel speeds. This leads to large overshoots in wheel speed, rapid torque reductions, and torque reapplication limit cycles. This may result in high wheel creep transients capable of damaging the rail head (in the case of a rail vehicle), reduced tractive effort, rapid suspension displacements, poor vehicle ride quality, and vehicle reference speed errors.

BRIEF DESCRIPTION

In an embodiment, a control method comprises determining wheel creep of a wheel operably coupled to a traction motor and limiting a rate of change of an excitation frequency applied to the traction motor to drive the wheel, based on the determined wheel creep. According to one aspect, the rate of change of the excitation frequency is limited if the wheel creep exceeds a wheel creep threshold.

Another embodiment relates to a control system. The control system comprises a first control module configured to generate an excitation frequency for a traction motor system. The traction motor system includes a traction motor and a traction inverter (e.g., power electronics for converting an input voltage to one or more output signals for controllably powering the traction motor). The first control module is configured to generate the excitation frequency based at least in part on a speed and a throttle command; the speed is associated with one of the traction motor or a wheel driven by the traction motor. The control system further comprises a second control module configured to limit a rate of change of the excitation frequency responsive to a wheel creep of the wheel exceeding a wheel creep threshold.

Aspects of the inventive subject matter involve restricting the rate at which the excitation frequency to a traction motor can change once a wheel creep threshold has been exceeded. Thus, once a wheel driven by a traction motor begins to accelerate away from its creep setpoint, due to the rate limit and subsequent restriction in excitation frequency, the motor begins immediately to deliver a reduced value of accelerating torque, preventing the wheel from large creep overshoots. In effect, the gain reduction (motor torque) characteristic of the traction motor is leveraged to counter the creep gain that naturally occurs for wheeled vehicles once their wheels begin to spin (slip) or slide.

In one embodiment, a control method (e.g., for controlling a traction motor of a vehicle) includes determining wheel creep of a wheel operably coupled to the traction motor and, based on the determined wheel creep, limiting a rate of change of an excitation frequency of current that is applied to the traction motor to drive the wheel.

In one embodiment, a control method (e.g., for controlling a traction motor of a vehicle) includes determining whether wheel creep of a wheel operably coupled to the traction motor exceeds a wheel creep threshold and limiting a rate of change of an excitation frequency applied to the traction motor to drive the wheel when the wheel creep exceeds the wheel creep threshold.

In another embodiment, a control method (e.g., for controlling a traction motor of a vehicle) includes determining whether a wheel driven by the traction motor has accelerated away from a creep setpoint by at least a threshold and controlling an excitation frequency applied to the traction motor to reduce accelerating torque delivered by the motor to the wheel when the wheel has accelerated away from the creep setpoint by at least the threshold.

In one embodiment, a control system (e.g., for a vehicle having a traction motor) includes first and second control modules. The first control module is configured to generate an excitation frequency of a current supplied to a traction motor of a traction motor system, based at least in part on a throttle command and a speed associated with one of the traction motor or a wheel driven by the traction motor. The second control module is configured to limit a rate of change of the excitation frequency responsive to a wheel creep of the wheel exceeding a wheel creep threshold.

DRAWINGS

The foregoing and other advantages and features of the invention will become apparent upon reading the following detailed description and upon reference to the drawings in which.

DETAILED DESCRIPTION

Embodiments of the inventive subject matter relate to systems and methods for traction motor control in a vehicle. Onboard the vehicle is a vehicle traction system, which includes a control system and a traction motor system. The traction motor system includes a traction motor and an inverter electrically connected to the traction motor. The control system generates signals for controlling the inverter to produce power waveforms for powering the traction motor. A wheel is operably coupled to the traction motor (e.g., through a gear and/or axle set). The wheel is driven by the motor during a motoring mode of operation, and the wheel drives the motor during a dynamic or regenerative braking mode of operation. The control system also comprises a first control module and a second control module. (The modules may comprise electronic hardware and/or software, and may be part of a common controller card or similar electronics unit for motor control.) The first control module is configured to generate an excitation frequency for the traction motor system, based at least in part on a speed and a throttle command. The speed is associated with the traction motor and/or the wheel driven by the traction motor, and information of the speed may be provided by a speed sensor. The second control module is configured to limit a rate of change of the excitation frequency responsive to a wheel creep of the wheel exceeding a wheel creep threshold. Thus, once the wheel begins to accelerate away from a creep setpoint (or otherwise exhibits behavior of a forthcoming large creep overshoot, with "large" meaning an increase in creep that is over a designated magnitude), the motor is controlled (through the limit/restriction on the excitation frequency rate of change) to deliver a reduced value of accelerating torque, preventing the wheel from fully realizing the large creep overshoot.

Embodiments of the inventive subject matter are illustrated herein in regards to locomotives and other rail vehicles (e.g., in the context of a train). However, such embodiments also are applicable to off-highway vehicles or other vehicles more generally.

Figure 1:
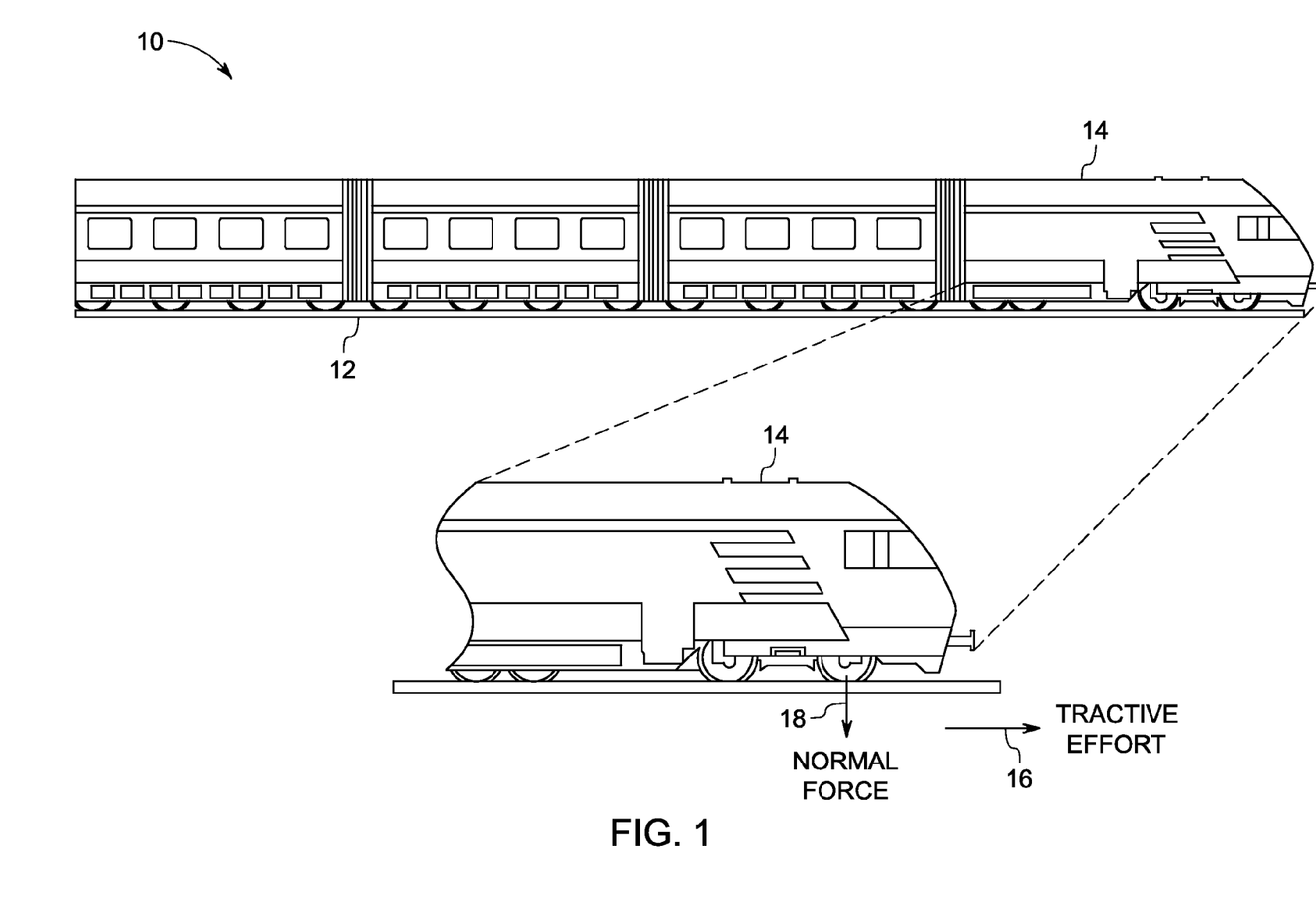
FIG. 1 is diagrammatical view of a train including a locomotive, and illustrating the tractive effort and adhesion of the locomotive controlled in accordance with an embodiment of this inventive subject matter.

FIG. 1 is diagrammatical view of a vehicle system 10 including a traction vehicle 14, and illustrating the tractive effort and adhesion of the traction vehicle 14. The vehicle system 10 is shown and may be described herein as a train, but not all embodiments described herein are limited to trains. Additionally, the traction vehicle 14 is shown and may be described as a locomotive, but may represent another type of vehicle. The vehicle system 10 runs on a route 12, such as a set of parallel rails of a railroad track. The traction vehicle 14 drives the vehicle system 10 using electric traction motors at each axle-wheel set, as described in greater detail below. In a motoring mode of operation, the traction motors deliver torque to the vehicle wheels, which exert tangential force (e.g., tractive effort 16) on the route 12, thereby propelling the vehicle system 10 along the route 12. The tractive effort 16 developed at each wheel of the traction vehicle 14 is proportional to a normal force 18 acting on the wheel. The total tractive effort developed by the traction vehicle 14 is the sum of all the wheel tractive efforts.

Figure 2:
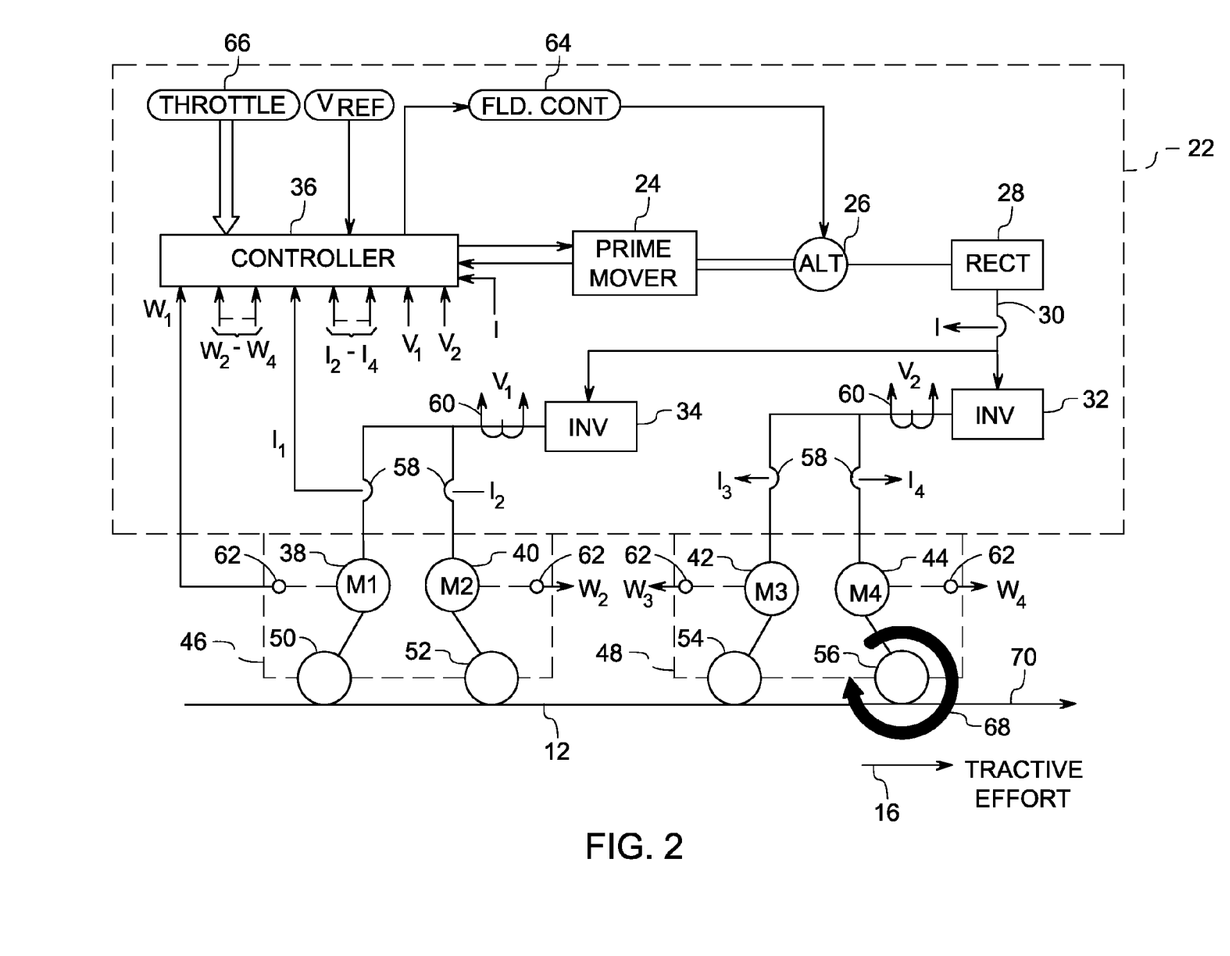
FIG. 2 is a diagrammatical representation of exemplary principal components of a propulsion system for a diesel-electric locomotive in accordance with aspects of the present techniques.

FIG. 2 presents a simplified block diagram of an exemplary vehicle system with which the inventive subject matter may be used. A propulsion system 22 of FIG. 2 includes a variable speed prime mover or engine 24 mechanically coupled to a rotor of a dynamo electric machine 26 comprising, in this case, a 3-phase alternating current (AC) synchronous generator or alternator. The 3-phase voltages developed by alternator 26 are applied to AC input terminals of a conventional power rectifier bridge 28. The direct current (DC) output of bridge 28 is coupled via a DC link 30 to a number of controlled inverters 32 and 34, which invert the DC power to AC power at a selectable variable frequency. The inverters 32 and 34 employ high power gate turn-off devices which switch in and out of conduction in response to gating signals from a system controller 36 so as to invert the DC voltage on DC link 30 to controlled frequency AC voltage. In the illustrated embodiment, the AC power is electrically coupled in energizing relationship to each of a plurality of adjustable speed AC traction motors 38, 40, 42 and 44. Prime mover 24, alternator 26, rectifier bridge 28 and inverters 32 and 34 are mounted on a platform of the traction vehicle 14, illustrated as a diesel-electric locomotive. The platform is, in turn, supported on two trucks 46 and 48, the first truck 46 having two axle-wheel sets 50 and 52 and the second truck 48 having two axle-wheel sets 54 and 56.

Each of the traction motors 38, 40, 42, and 44 is hung on a separate axle and its rotor is mechanically coupled, via conventional gearing, in driving relationship to the respective associated axle-wheel set. In the embodiment shown, the two motors 38 and 40 of axle wheel sets 50 and 52, respectively, are electrically coupled in parallel with one another and receive power from inverter 34 while motors 42 and 44 are similarly coupled to inverter 32. In some instances, however, it may be desirable to provide an inverter for each motor or to couple additional motors to a single inverter. The entire scope of the inventive subject matter is not limited to such 4-axle systems and is equally applicable to other systems, for example, such as 6-axle locomotives with six inverters each connected for powering a respective one of six traction motors each connected to respective ones of the six axles, or other systems.

Suitable current transducers 58 and voltage transducers 60 are used to provide current and voltage feedback signals which are respectively representative of the magnitudes of current and voltage applied to motors 38, 40, 42, and 44. Speed sensors 62 are used to provide speed signals representative of the rotational speeds W1-W4 in revolutions per minute (RPM) or proportional units of the motor shafts. These speed signals are converted to wheel speeds in accordance with an embodiment of the inventive subject matter. For simplicity, only single lines have been indicated for power flow, although it will be apparent that motors 38, 40, 42, and 44 can be three phase motors so that each power line represents three lines in such applications.

The magnitude of output voltage and current supplied to rectifier bridge 28 is determined by the magnitude of excitation current supplied to the field windings of alternator 26 by a field controller 64 which may be a conventional phase controlled rectifier circuit, for alternator fields generally requiring DC excitation. The excitation current is set in response to an operator demand in a throttle 66 for vehicle speed by controller 36, which is in turn responsive to actual speed as represented by signals W1-W4. Controller 36 converts the throttle command to a corresponding torque request for use in controlling motors 38, 40, 42, and 44. Since AC motor torque is proportional to rotor current and air gap flux, these quantities may be monitored. More commonly, other quantities, such as applied voltage, stator current and motor RPM, may be used to reconstruct motor torque in controller 36. In an electrical braking or retarding mode of operation, inertia of the moving vehicle is converted into electrical energy by utilizing the traction motors as generators and motor voltage and current are controlled to set a desired braking effort.

Figure 3:
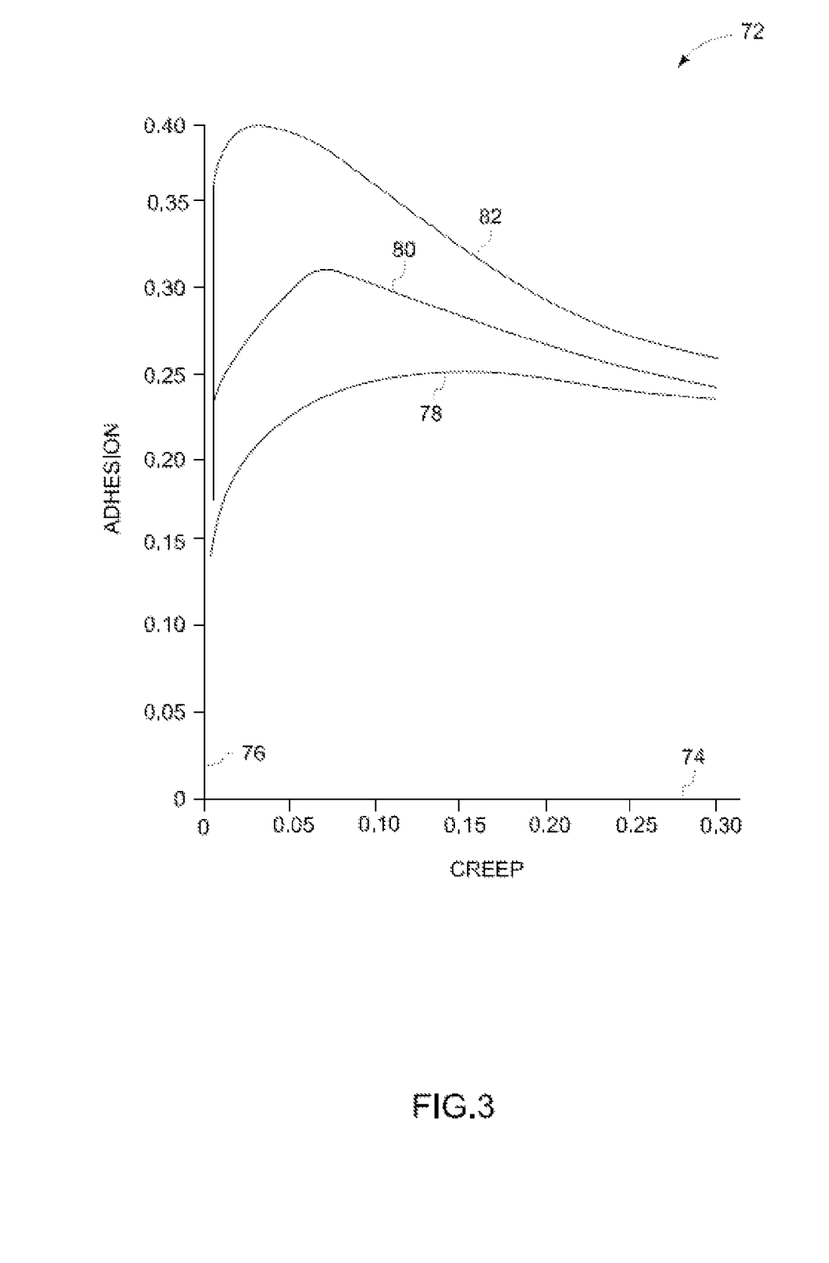
FIG. 3 is a graphical representation of an exemplary functional relationship between adhesion and creep for different weather conditions, illustrating optimal creep levels for adhesion.

Referring to FIG. 3, a graphical representation is provided of relationships between adhesion and creep for different weather conditions, illustrating optimal creep levels for adhesion. Each curve illustrates an example of wheel-to-rail slipping or sliding in the motoring mode for three different weather conditions common to locomotive applications. The horizontal or the X-axis 74 of the adhesion-creep curves represents per unit creep values expressed as fractions and the vertical or the Y-axis 76 represents adhesion (friction coefficient) values also expressed as fractions. The three different weather conditions that were chosen for illustrative purposes are represented by "wet" curve 78, "dry" curve 80, and "dry with sand" curve 82. It will be noted that the highest adhesion is available with a rail, which is both dry and sanded. As shown by the illustrated curve, the adhesion reaches a peak on the "dry and sanded" adhesion-creep curve at about a 0.05 per unit creep level and then gradually reduces as creep speed increases. Referring to the "dry" adhesion-creep curve, maximum adhesion is obtained at some value of per unit creep less than 0.1, while the "wet" adhesion-creep curve indicates that maximum adhesion is not realized until per unit creep obtains typically a value somewhere between 0.15 and 0.25. As shown in FIG. 3, the best conditions for obtaining the greatest pulling force or tractive effort does not occur at zero creep, although the optimum creep level changes with conditions and can be expressed to change during the course of transport over any distance.

In general, it may be desirable to maintain per unit creep or creep speed at the point at which maximum adhesion occurs. It is thus possible to select the appropriate adhesion-creep curve based on observed weather conditions, and determine from this curve an ideal creep that must be achieved and maintained in order to achieve and maintain a maximum adhesion value. In addition, there are maximum and minimum allowable creep levels that are typically a function of vehicle speed, wheel tractive efforts, wheel speeds and the extent of axle torsional vibration. Additional constraints are also applied to decide the allowable creep. These factors and creep limits combine to allow sufficient non-zero creep levels for starting the locomotive from zero speed and to provide a fixed allowable creep level when the axle is rotating at the reference speed mode.

Figure 4:
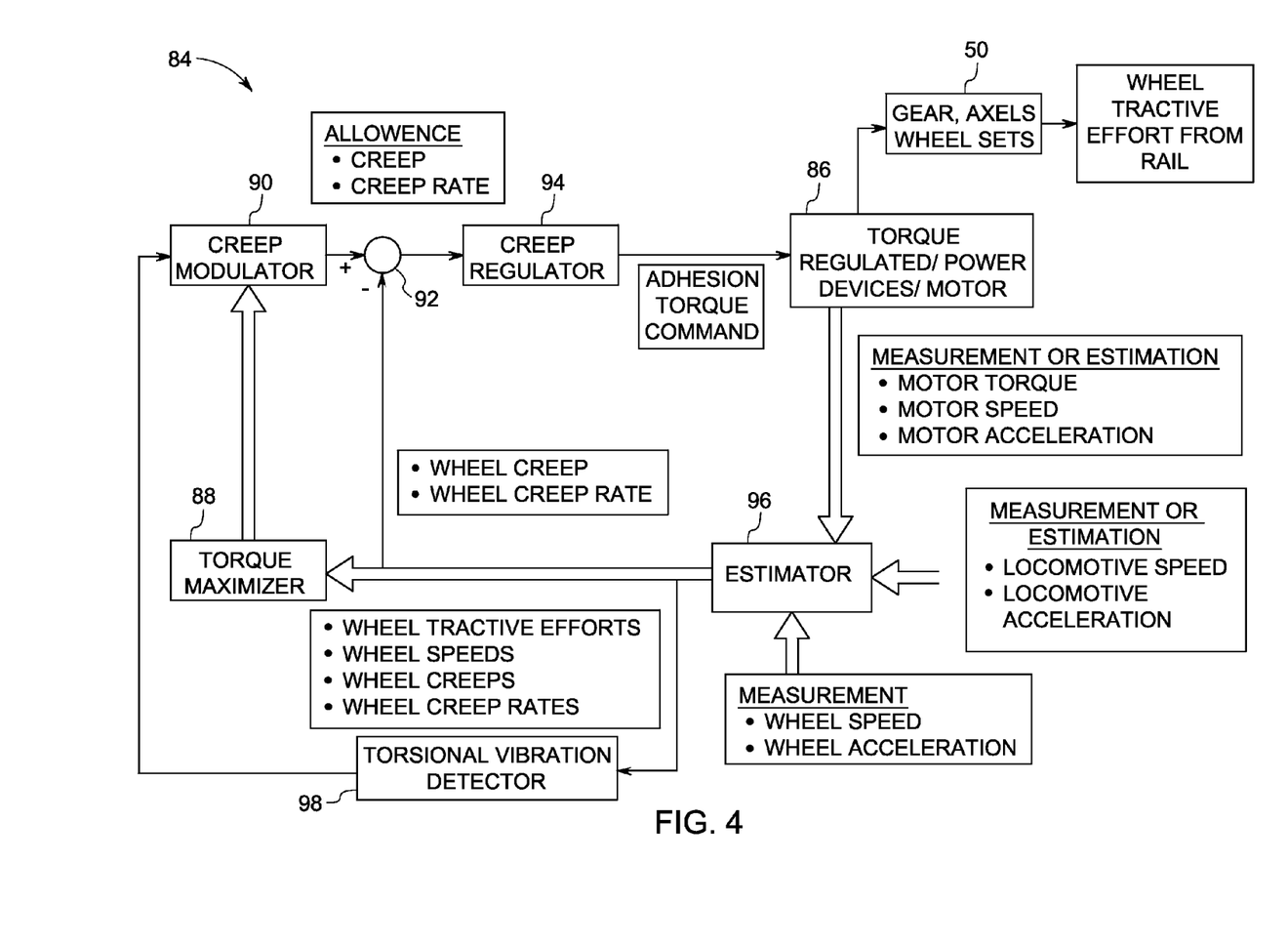
FIG. 4 is a diagrammatical representation of an adhesion control system in which embodiments of the inventive subject matter may be implemented.

FIG. 4 is a functional block diagram illustrating an adhesion control system 84 residing in the respective controllers of inverters 32 or 34 for each axle shown in FIG. 2, for separate creep control of each individual axle. The adhesion control system 84 comprises a torque increaser 88, a creep modulator 90, a creep regulator 94, an estimator 96, and a torsional vibration detector 98. One or more embodiments of the inventive subject matter may be implemented in conjunction with the system shown in FIG. 4.

Tractive effort optimization in an adhesion control system may involve determination of an optimum allowable creep for the appropriate adhesion-creep curve and a feedback control system to track and maintain this optimum allowable creep within a range of minimum error. This function is realized by an adhesion control system 84 of FIG. 4. This adhesion control system acts to ensure that the locomotive operates within a certain acceptable range around the peak of an appropriate adhesion-creep curve.

The torque increaser 88 measures traction system performance levels and determines the desired torque increaser state or operating mode for maximizing or increasing traction performance of each individual axle. The torque increaser 88 uses the best possible estimates/measurements of actual speeds and tractive efforts of both the wheels of any axle-wheel set obtained from the estimator 96 to estimate the traction performance level of the axle-wheel set and determine an appropriate torque increaser state.

The estimator 96 estimates the wheel speeds, wheel tractive efforts, and/or wheel creep values. If direct measurements of the wheel speeds and wheel tractive efforts are available, the estimator 96 can minimize the noise effects in these measurements. Moreover, wheel creep values may be estimated by subtracting the locomotive/ground speed estimate/measurement from the wheel speed estimates/measurements. Several methods can be used to estimate the locomotive speed such as, for example, GPS-based methods. The estimator 96 may be configured to additionally provide an estimate of the axle torsional torque.

The torsional vibration detector 98 digitally processes the wheel speed estimates/measurements, the difference in the wheel speed estimates/measurements of each axle, wheel tractive effort estimates/measurements and axle torsional torque estimate obtained from the estimator 96, in addition to the motor torque feedback, motor speed, wheel strain, axle strain and dog-bone strain in order to detect an unacceptable level of torsional vibration in each axle. A functional block diagram of 98 is illustrated in more detail below.

The output of the torque increaser 88 along with a signal representative of the level of axle torsional vibration mode obtained from the torsional vibration detector 98 is provided to the creep modulator 90. The creep modulator 90 processes these inputs to control the operating creep level of the locomotive gear and axle set described above in relation to FIG. 2. The function of the creep modulator 90 is to modulate the allowable creep level for each axle between a maximum allowable creep level and a minimum allowable creep level. These maximum and minimum allowable creep levels are typically functions of vehicle speed, wheel tractive efforts, wheel speeds and the extent of axle torsional vibration. Additional constraints are also applied to decide the allowable creep. These factors and creep limits combine to allow sufficient non-zero creep levels for starting the locomotive from zero speed and to provide a fixed allowable creep level when the axle is functioning at the reference speed mode. An exemplary creep modulator is disclosed in U.S. Pat. No. 6,163,121, issued on Dec. 19, 2000, to General Electric Company (hereby incorporated into the present disclosure by reference).

The actual realized creep for each axle-wheel set is compared with the associated creep set point from creep modulator 90 at the comparator 92. The error determined by the comparison is input to the creep regulator 94 whose objective is to keep this error as small as possible under all operating conditions through feedback control. The creep regulator 94 may be a proportional-plus-integral controller or a higher order controller designed to ensure stability of the creep regulation loop for every axle-wheel set, even when operating in the negative slope region of an adhesion characteristic curve. The output from the creep regulator 94 is a torque command that is fed to a torque regulator system 86 associated with the axle and which typically includes the associated torque regulation circuit, the power devices, and the electric motor illustrated in FIG. 2. These motors drive the associated axle-wheel set through appropriate gearing as shown in 50.

Figure 5:
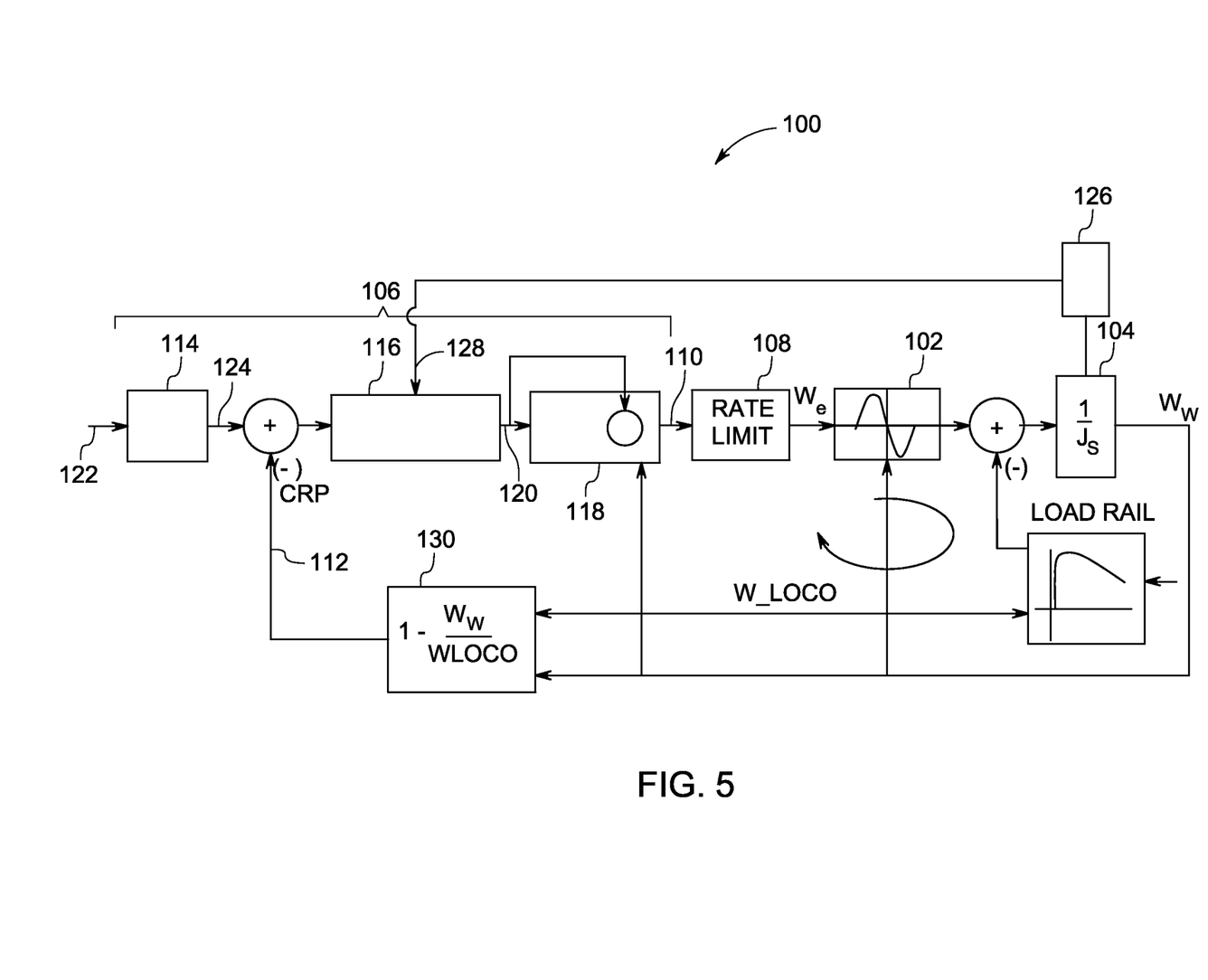
FIG. 5 is a schematic diagram of an embodiment of the inventive subject matter.

FIG. 5 is a schematic diagram of a control system 100, according to an embodiment of the inventive subject matter described herein. The control system 100 is part of a vehicle traction system of a traction vehicle, such as the traction vehicle 14. The control system 100 includes a traction motor system 102 having a traction motor and an inverter electrically connected to the traction motor. In FIG. 5, the traction motor system 102 represents one or more traction motors and one or more inverters. The control system 100 generates signals for controlling the inverter to produce power waveforms for powering the traction motor. A wheel 104 is operably coupled to the traction motor. The control system 100 comprises a first control module 106 and a second control module 108. (The modules described herein may comprise or represent electronic hardware and/or software, and may be part of a common controller card or similar electronics unit for motor control.)

The first control module 106 is configured to generate an excitation frequency 110 for the traction motor system 102, based at least in part on one or more measured speeds 128 and a throttle command 122. The measured speeds 128 can be associated with the traction motor and/or the wheel driven by the traction motor, and information of the measured speed may be provided by one or more sensors 126. The measured speeds 128, for example, may be or relate to a measure of wheel creep 112. In one embodiment, the sensors 126 provide data representative of the speed at which the traction motor is rotating the wheel 104 and/or data representative of the speed at which the traction vehicle is moving along the route. For example, the sensors 126 can represent a rotation speed sensor and a movement speed sensor. The rotation speed sensor can be operatively connected with the wheel 104 and/or traction motor in order to determine how fast the wheel 104 is rotating and/or how fast the traction motor is operating, and to generate data representative of such speeds. The movement speed sensor can generate data representative of how fast the traction vehicle is moving along the route. By way of example, the movement speed sensor can include or use location data generated by a location determining system, such as a Global Positioning System receiver, in order to generate the data representative of the speed at which the traction vehicle moves along the route. This data representative of the measured speeds 128 can be communicated to a creep regulator 116 described below.

The first control module 106 includes a torque increaser 114, the creep regulator 116, and a torque regulator 118. These components may be configured similarly to corresponding components in FIG. 4. In one embodiment, one or more of the torque increaser 114, creep regulator 116, and/or torque regulator 118 may be provided as hardware and/or associated software components of the first control module 106.

In one example, in operation, the first control module 106 receives an input signal 122 of desired tractive effort (e.g., power, torque, speed, or the like) that is sought to be produced by the propulsion system of the traction vehicle (e.g., from a vehicle control system), which incorporates or is generated based (at least in part) on a throttle command. The throttle command may be provided to the torque increaser 114 as the input signal 122 from a throttle (e.g., throttle 66) of the vehicle control system, from a system that autonomously determines throttle settings for the traction vehicle (e.g., an energy management system that determines throttle and/or brake settings in order to cause the traction vehicle to follow a trip plan having operational settings of the vehicle that are designated as a function of time and/or distance along a trip in order to reduce at least one of emissions generated and/or fuel consumed by the traction vehicle during the trip), or from another input.

The torque increaser 114 generates an output signal 124 based on the input signal 122. This output signal 124 can represent the amount of torque that corresponds to the desired tractive effort that is represented by the input signal 122. For example, if the input signal 122 represent a desired power output from the propulsion system of the traction vehicle, then the torque increaser 114 can create the output signal 124 to represent the torque that is estimated or calculated to be needed to be produced by one or more of the traction motors in order for the propulsion system to actually generate the desired power output. If the input signal 122 represent a desired speed of the traction vehicle, then the torque increaser 114 can create the output signal 124 to represent the torque that is estimated or calculated to be needed to be produced by one or more of the traction motors in order for the propulsion system to actually generate sufficient output to cause the traction vehicle to travel at the desired speed. If the input signal 122 represents a desired torque output from the propulsion system of the traction vehicle, then the torque increaser 114 can create the output signal 124 to represent this torque. The output signal 124 may be generated without the torque increaser 114 knowing the wheel creep 112 of one or more wheels in one embodiment. The amount of torque that is represented by the output signal 124 can depend on one or more factors, such as a current speed of the traction vehicle, the wheel creep 112 of one or more wheels of the traction vehicle, the size (e.g., length and/or weight) of the vehicle, and the like.

The creep regulator 116 outputs a torque command 120 responsive to an output of the torque increaser 114 and wheel creep 112. In one embodiment, the creep regulator 116 receives the wheel creep 112 directly from another module, such as a creep module 130 that receives the data representative of the rotation speed of the traction motor or wheel 104 and/or the data representative of the movement speed of the traction vehicle from the speed sensors 126. Alternatively or additionally, the creep regulator 116 may calculate the wheel creep 112 based on the data received from the speed sensors 126.

Responsive to the torque command 120 and possibly other inputs (such as the signal of desired torque form the vehicle control system, depending on how the module 106 is configured), the torque regulator 118 outputs an excitation frequency 110. The excitation frequency 110 represents the frequency of the current that is to be supplied to the traction motor in order to power the traction motor and cause the traction motor to provide the desired tractive effort represented by the throttle command 122. The excitation frequency 110 may change based on several factors, such as changes in the desired tractive effort (as input by an operator, energy management system, or the like), changes in the wheel creep 112 (as determined or received by the creep regulator 116, where the torque regulator 118 can increase the excitation frequency for decreasing wheel creep 112 and/or decrease the excitation frequency for increasing wheel creep 112), deterioration in the health and/or age of the traction motor (e.g., where an increased excitation frequency may be needed to cause an older and/or deteriorated traction motor to provide a desired tractive effort relative to a newer and/or healthier traction motor), and the like.

Due to, among other factors, changes in the wheel creep 112 as the traction vehicle moves, changes in the torque command 120, and the like, the excitation frequency 110 that is output by the torque regulator 118 may change with respect to time. For example, the excitation frequency 110 may change at a relatively rapid pace due to detected changes in the wheel creep 112. The excitation frequency 110 may be changed by the torque regulator 118 in order to ensure that the traction motor generates sufficient torque to satisfy the torque command 120 in light of the changes in the wheel creep 112 and/or other factors, even if the throttle command 122 remains unchanged or changes relatively little.

The second control module 108 receives the excitation frequency 110. The second control module 108 is configured to limit a rate of change of the excitation frequency 110. As described above, the excitation frequency 110 may change over time due to various factors in order to cause the traction motor to generate the torque that corresponds to the throttle command 122. The second control module 108 may limit the rate of change in the excitation frequency responsive to the wheel creep 112 of the wheel 104 exceeding a wheel creep threshold 200 (see FIG. 6). For example, in one embodiment, the second control module 108 may not limit the rate of change in the excitation frequency until the wheel creep 112 exceeds a non-zero and non-infinite wheel creep threshold 200. Alternatively, the second control module 108 may always limit the rate of change in the excitation frequency, but the limits applied to the rates of change in the excitation frequency may be based on the wheel creep 112.

In one embodiment, the second control module 108 compares information of the wheel creep 112 to the wheel creep threshold 200, and if the wheel creep 112 exceeds the threshold 200, the second control module 108, limits or restricts the rate at which the excitation frequency can change. The wheel creep 112 can be provided to the second control module 108 by the first control module 106 (e.g., the torque regulator 116). Alternatively or additionally, the second control module 108 can determine the wheel creep 112 based on the data provided by one or more of the speed sensors 126, as described above. The limits applied to the rate of change in the excitation frequency can result in a change in wheel or motor speed information (as provided from the speed sensor 126 and indicative of and/or resulting from a forthcoming spike in wheel creep 112) that would otherwise result in the first control module adding or increasing the excitation frequency, the second control module 108 may prevent or limit his addition to or increase in the excitation frequency.

The limit on the rate of change in the excitation frequency can be expressed as an absolute limit or a relative limit. For example, with respect to an absolute limit, the second control module 108 may not permit the excitation frequency to increase by more than a designated amount (e.g., a change in frequency) within a designated time period. With respect to a relative limit, the second control module 108 may not permit the excitation frequency to increase by more than a designated percentage of the excitation frequency within a designated time period. The limits applied by the second control module 108 may be customized to individual traction motors and/or traction vehicles. These limits may be hard-coded in the software of the system 100 and/or may be modified by an operator of the traction vehicle.

When a limit on the rate of change in the excitation frequency is being applied, the second control module 108 compares changes in the excitation frequency over time and determines an actual rate of change in the excitation frequency. This rate may be calculated as a different between previous and subsequent excitation frequencies divided by the time period between when the previous and subsequent excitation frequencies are determined by the torque regulator 118 and/or communicated to the second control module 108. The second control module 108 compares the actual rate of change in the excitation frequency to the limit on the rate of change in the excitation frequency. If the actual rate does not exceed the limit, then the second control module 108 does not alter the excitation frequency output from the torque regulator 118. As a result, the excitation frequency output from the torque regulator 118 is used as the frequency of the current that is supplied to the traction motor in order to power the motor to propel the vehicle.

If the actual rate does exceed the limit, however, then the second control module 108 can limit the excitation frequency that is output from the torque regulator 118 by altering the excitation frequency. In one embodiment, the second control module 108 alters the excitation frequency by keeping the excitation frequency as the same value as a previous excitation frequency. For example, the second control module 108 may change the excitation frequency to a frequency that is the same as the previous excitation frequency. As a result, the rate of change in the excitation frequency may be decreased to a value that is smaller than the limit. Alternatively, the second control module 108 may alter the excitation frequency by reducing the excitation frequency to another value that results in the rate of change in the excitation frequency being no greater than the limit on the rate of change in the excitation frequency. The excitation frequency that is output from the torque regulator 118 (as altered by the limit when applicable) is used as the frequency of the current that is supplied to the traction motor in order to power the motor to propel the vehicle.

The wheel creep threshold 200 can be based on the speed at which the vehicle is moving along the route. For example, at speeds below a designated threshold (such as a value that is indicative of a relatively low vehicle speed, such as less than 48 kilometers per hour, less than 32 kilometers per hour, less than 16 kilometers per hour, less than 8 kilometers per hour, and the like), the threshold wheel creep may be 3.5% (or another value). At speeds above this threshold, a larger threshold wheel creep may be used. If the detected wheel creep for a wheel-axle set exceeds this threshold, then the limit on the rate of change in excitation frequency supplied to the traction motor or motors associated with the same wheel-axle set may be applied.

The extent to which the rate of change of the excitation frequency is limited may be based on limiting a gain in the wheel creep. That is, the excitation frequency rate of change is limited to the extent to limit a gain in wheel creep. In one embodiment, the excitation frequency rate of change is restricted or limited to limit the wheel creep gain to no more than 1.61 kph/sec (e.g., 1 mph/sec).

In an embodiment, the rate of change of the excitation frequency is limited when the wheel speed is below a designated value (such as a value that is indicative of a relatively low vehicle speed, such as less than 48 kilometers per hour, less than 32 kilometers per hour, less than 16 kilometers per hour, less than 8 kilometers per hour, and the like). For example, at higher speeds (such as speeds at or above a designated threshold), the rate of change in the excitation frequency of the traction motors may not be limited but, at lower speeds (e.g., speeds below the designated threshold), the rate of change in the excitation frequency may be limited The limit on the rate of change in the excitation frequency can be based on the speed at which the traction vehicle is traveling. For example, the limit on the rate of change in the excitation frequency can increase for faster speeds and decrease for slower speeds. As a result, the excitation frequency can vary at a greater rate within the designated limit at faster speeds of the traction vehicle. Conversely, at slower speeds, the rate of changes in the excitation frequency can be more restricted.

The limit on the allowed rate of change in the excitation frequency can continue to be applied to a traction motor or traction motors until the wheel creep that is monitored for the wheel-axle set or sets associated with the motor or motors falls below a designated, lower wheel creep threshold. This lower wheel creep threshold may be a non-zero threshold that differs from the threshold wheel creep used to determine when to apply the limit (also referred to as the upper threshold wheel creep). For example, if the threshold wheel creep used to determine when to apply the limit on the rate of change in the excitation frequency is 3.5% wheel creep, then the lower wheel creep threshold that is used to determine when to remove this limit can be another, lower value, such as 2.5% wheel creep (or another value). The lower wheel creep threshold may be different from the upper wheel creep threshold to prevent relatively brief, transitory variations in the wheel creep from causing the limit to be repeatedly and relatively rapidly applied and removed in an alternating manner. For example, if the upper and lower wheel creep thresholds were equivalent, then in some applications, the monitored wheel creep may vary above and below the thresholds relatively rapidly, thereby causing the limit to be relatively rapidly applied, removed, applied, removed, and so on, even though the wheel creep is not significantly decreasing. Making the lower wheel creep threshold be different and smaller than the upper wheel creep threshold may ensure that the limit on the rate of change in the excitation frequency continues to be applied until the wheel creep is actually decreased due to the application of the limit on the rate of allowable change in the excitation frequency.

Figure 6:
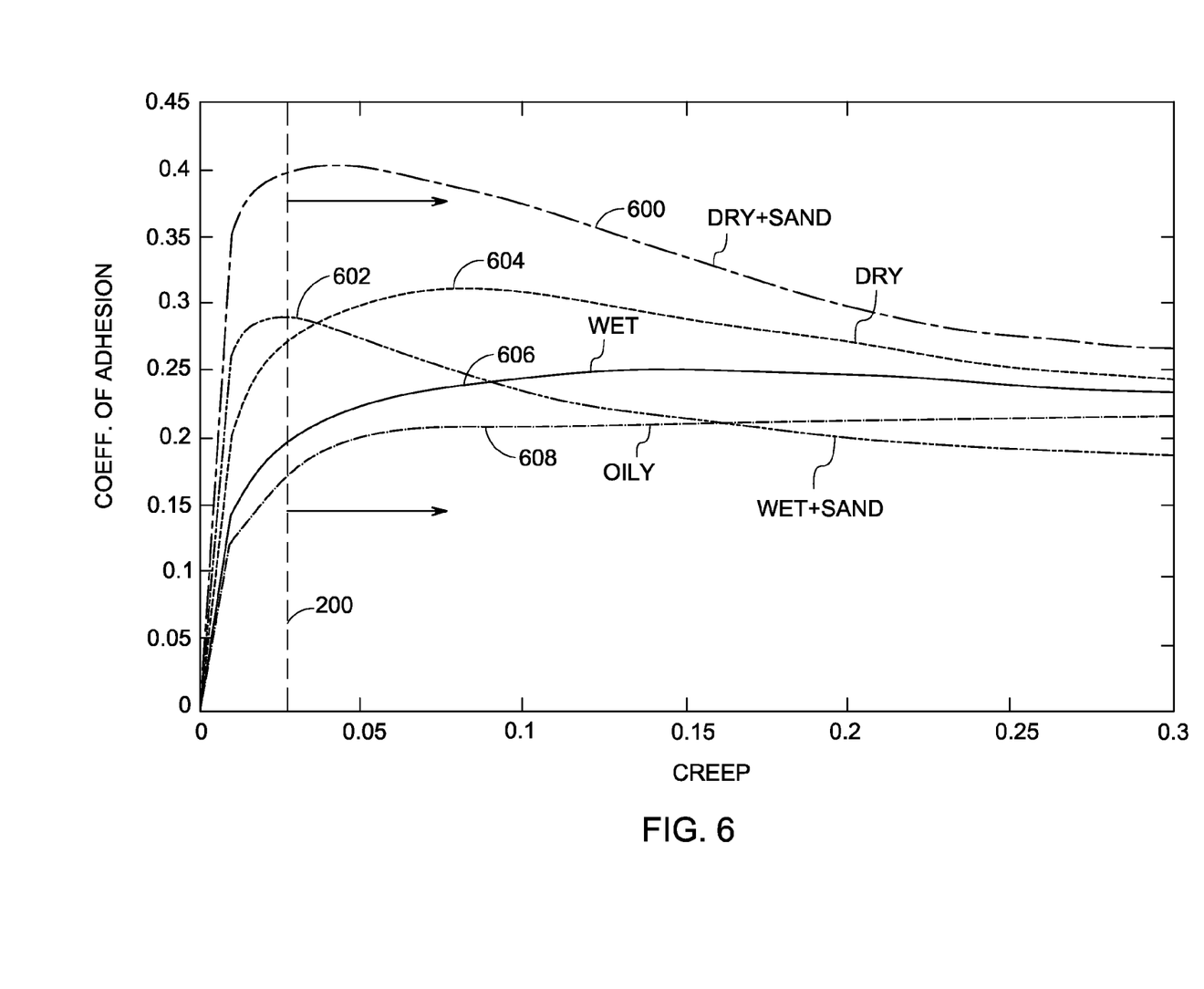
FIG. 6 is a graphical representation of various adhesion curves showing wheel creep thresholds, according to an embodiment of the inventive subject matter.

FIG. 6 shows example wheel creep thresholds 200 for various adhesion curves 600, 602, 604, 606, 608. The adhesion curves 600, 602, 604, 606, 608 are based on known wheel/surface interfaces for various weather conditions, as described above in regards to FIG. 3. Threshold values may be selected as within three percent (3%) of the optimum creep for the highest level of adhesion (for a given interface and weather condition). For example, the upper threshold wheel creep that is used to determine when to apply the limit on the rate of change in the excitation frequency may be 3% of an optimum creep for a designated adhesion level based on the condition of the route (e.g., a dry route with sand applied to the route, a dry route with no sand applied to the route, a wet route with sand applied to the route, a wet route with no sand applied to the route, an oily route, and the like). The condition of the route may be selected by an operator of the traction vehicle.

Alternatively, the wheel creep threshold that is used to determine when to limit the rate of change in the excitation frequency can be a designated threshold, such as a threshold that is input by the operator and/or hard-coded into the system 100, without reference to the condition of the route on which the traction vehicle is currently traveling.

The traction motors described herein may be induction motors or other AC motor types where the frequency of the applied voltage is a contributor to the developed motor torque. Examples of methods to measure creep, wheel speed, wheel tractive effort, etc. are found in commonly owned U.S. Pat. No. 7,285,926, issued Oct. 23, 2007, which is hereby incorporated by reference herein in its entirety.

Figure 7:
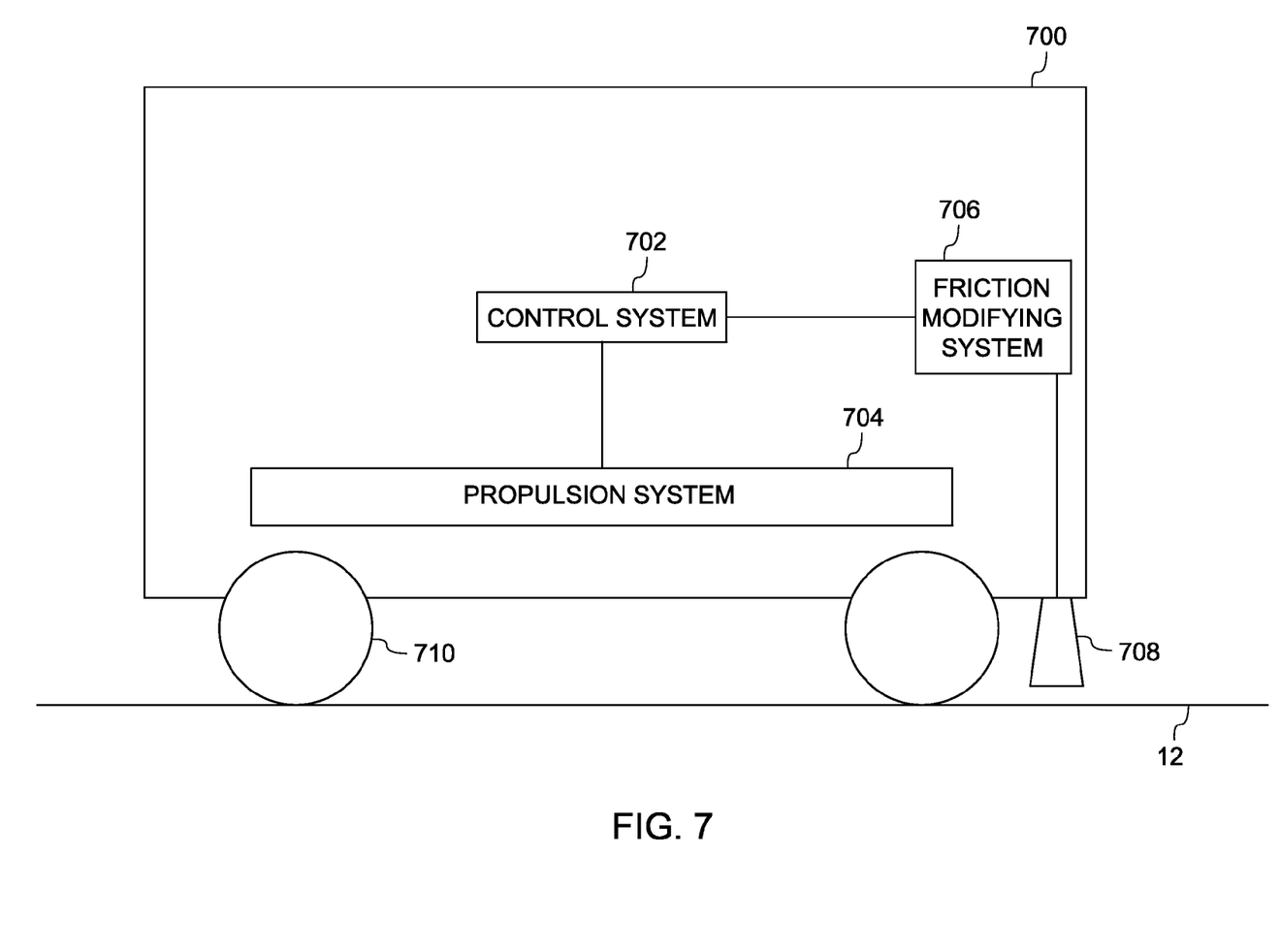
FIG. 7 is a schematic diagram of a traction vehicle in accordance with another embodiment.

FIG. 7 is a schematic diagram of a traction vehicle 700 in accordance with another embodiment. The traction vehicle 700 may be similar to the traction vehicle 14 (shown in FIG. 1) and may be part of a larger vehicle system 10 (shown in FIG. 1). The traction vehicle 700 includes a control system 702, which may be similar to or represent the control system 100 (shown in FIG. 5). A propulsion system 704 of the vehicle 700 represents the throttle, traction motors, inverters, axles, gears, and the like, that are used to control propulsion and breaking of the vehicle 700.

In the illustrated embodiment, the traction vehicle 700 includes a friction modifying system 706. The friction modifying system 706 includes or is connected with a friction modifying substance applicator 708, which applies one or more friction modifying substances to the route 12 in order to change a friction coefficient of the route 12 and/or adhesion of wheels 710 of the vehicle 700 to the route 12. The friction modifying substances can include sand, air, lubricant (e.g., oil), or other materials that increase or decrease the adhesion of the wheels 710 to the route 12.

The friction modifying system 708 can include one or more processors, controllers, and the like, along with associated circuitry, for controlling when the applicator 708 applies the friction modifying substances to the route 12. In one embodiment, the friction modifying system 708 autonomously directs the applicator 708 to apply a friction modifying substance to the route 12 in response to the measured wheel creep 112 (shown in FIG. 5) of one or more wheels 710 of the vehicle 700. For example, when the wheel creep 112 approaches (e.g., comes within a designated amount of) the wheel creep setpoint or threshold at which the rate of change in excitation frequency is limited, the friction modifying system 708 can autonomously direct the applicator to apply one or more friction modifying substances that increase the friction coefficient of the interface between the route 12 and the wheels 710, such as air or sand. The friction modifying system 708 can autonomously attempt to increase the adhesion between the wheels 710 and the route 12 in order to prevent or delay the increase of the wheel creep 112 to the threshold at which the rate of change in excitation frequency of the current supplied to the traction motor is limited. Alternatively or additionally, the friction modifying system 708 can autonomously apply the friction modifying substance to the route 12 in response to the wheel creep 112 exceeding the threshold (and the rate of change in excitation frequency being limited). For example, once the limit on the rate of change in excitation frequency is applied, the friction modifying system 708 can attempt to increase the adhesion of the wheels 710 to the route 12 in order to reduce the time period that the limit on the rate of change in excitation frequency is applied.

Figure 8:
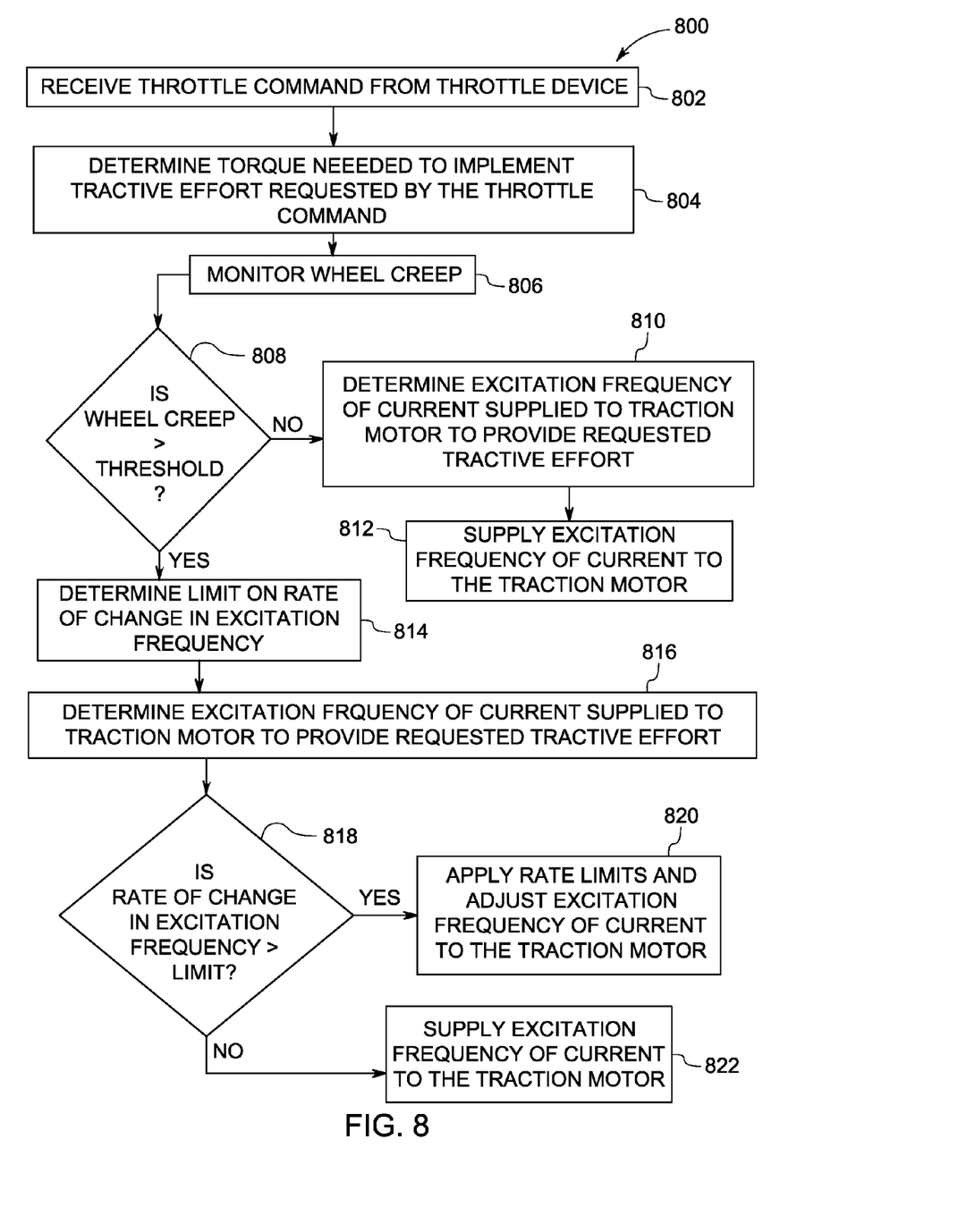
FIG. 8 is a flowchart of one embodiment of a method for controlling a traction motor.

FIG. 8 is a flowchart of one embodiment of a method 800 for controlling a traction motor. The method 800 may be used to control the excitation frequencies of current supplied to a traction motor. In a traction vehicle having multiple traction motors and/or axle-wheel sets connected to multiple traction motors, the method 800 may be individually applied to each of the traction motors such that different traction motors in the same vehicle may have differently controlled excitation frequencies.

At 802, a throttle command is received from a throttle device. The throttle command may represent the tractive effort that is manually or autonomously requested to be provided by one or more traction motors of the vehicle. The throttle device that is used to provide the throttle command may be a throttle lever, pedal, button, touchscreen, dial, energy management system, or the like.

At 804, the torque that is needed from a traction motor to provide the requested tractive effort is determined. This torque may be determined from one or more factors, such as the current speed of the vehicle, the size of the vehicle, the wheel creep of one or more wheels of the vehicle, and the like, as described above.

At 806, wheel creep of the vehicle is monitored. For example, the wheel creep of one or more wheels of the vehicle can be measured as the vehicle travels. The wheel creep can be measured in a variety of manners, including by measuring a difference between the angular velocity of the outer perimeter of the wheel (which may be based on the movement speed of the vehicle along a route) and the rotational velocity at which the traction motor is rotating the wheel. The wheel creep can be monitored on a periodic, continual, or as-prompted basis during travel of the vehicle.

At 808, a determination is made as to whether the wheel creep exceeds a wheel creep threshold. As described above, the wheel creep threshold may be based on a wheel creep setpoint that represents a wheel creep that will or is likely to result in the wheel losing adhesion to the route and slipping (e.g., moving relative to the route). The wheel creep threshold may be a fraction of the setpoint so that the comparison of the wheel creep to the threshold indicates whether the wheel creep is approaching the threshold.

If the wheel creep does not exceed the threshold, then the wheel creep may not be approaching the wheel creep associated with break-away between the wheel and the route (and slippage of the wheel on the route). As a result, the rate of change in excitation frequencies applied to the traction motor may not need to be limited. Consequently, flow of the method 800 may proceed to 810.

At 810, an excitation frequency of the current supplied to the traction motor is determined. This excitation frequency may be the frequency of current that causes the motor to provide the torque that is needed to provide the tractive effort requested by the throttle command. At 812, the current is supplied to the traction motor at the excitation frequency. The motor is powered with the current and may change speeds based on the excitation frequency to alter the amount of torque provided by the motor.

Returning to the decision at 808, if the wheel creep exceeds the threshold, then the wheel creep may be approaching a wheel creep associated with break-away between the wheel and the route. As a result, the rate of change in excitation frequencies applied to the traction motor may need to be limited. Consequently, flow of the method 800 may proceed to 814.

At 814, a limit on the rate of change in the excitation frequency is applied. This limit can prevent the excitation frequency from changing too drastically and causing an increase in the wheel creep and/or cause wheel slip between a wheel and the route.

At 816, the excitation frequency of the current supplied to the traction motor is determined. This excitation frequency may be the frequency of current that causes the motor to provide the torque that is needed to provide the tractive effort requested by the throttle command.

At 818, a determination is made as to whether a rate of change in the excitation frequency exceeds the limit. For example, the change in excitation frequencies (e.g., from a previous excitation frequency to the excitation frequency determined at 816) over time is compared to the limit. If the rate of change in excitation frequencies exceeds the limit, then the excitation frequency may be increasing at such a rapid rate that the wheel creep is likely to further increase and/or cause wheel slip. As a result, flow of the method 800 continues to 820.

At 820, an excitation frequency other than the excitation frequency that is determined at 818 is used for the current supplied to power the traction motor. For example, and as described above, the excitation frequency determined at 816 may be changed to a previous excitation frequency or otherwise reduced so that the rate of change in the excitation frequency remains at or below the limit. The current is supplied to the traction motor at the changed excitation frequency.

Returning to the decision made at 818, if the rate of change in excitation frequencies does not exceed the limit, then the excitation frequency may not be increasing at too rapid rate of a rate. As a result, flow of the method 800 continues to 822.

At 822, current is supplied to the traction motor at the excitation frequency that is determined at 816. As described above, this current powers the traction motor to provide torque that is less likely to increase wheel creep and/or is less likely to cause wheel slip.

The limit on the rate of change in excitation frequency may continue to be applied until the wheel creep is reduced below a threshold. As described above, the threshold that is used to determine when to remove this limit may be lower than the threshold used to determine when to apply the limit. Using two different limits can reduce instances of the limit being alternatively applied and removed in a relatively rapid manner. Additionally or alternatively, the limit may continue to be applied until the wheel creep remains below the threshold used to determine when to apply the limit for at least a designated time period.

In one embodiment, a control method (e.g., for controlling a traction motor of a vehicle) includes determining wheel creep of a wheel operably coupled to the traction motor and, based on the determined wheel creep, limiting a rate of change of an excitation frequency of current that is applied to the traction motor to drive the wheel.

In one aspect, the rate of change of the excitation frequency is limited if the wheel creep exceeds a wheel creep threshold.

In one aspect, the rate of change of the excitation frequency is limited to a first rate of change value that is less than a second rate of change value sought to be applied to the traction motor by a regulator module according to the wheel creep. The regulator module includes at least one of a creep regulator or a torque regulator.

In one aspect, the wheel creep is determined at least in part based on a speed of the traction motor.

In one aspect, limiting the rate of change of the excitation frequency limits wheel creep gain of the wheel.

In one aspect, the wheel creep gain is limited to no more than 1.61 kph/sec.

In one aspect, the rate of change is limited to limit wheel creep gain of the wheel to no more than 1.61 kph/sec.

In one aspect, determining the wheel creep and limiting the rate of change of the excitation frequency are carried out independently for each of a plurality of wheel and traction motor pairs of the vehicle.

In one aspect, determining the wheel creep and limiting the rate of change of the excitation frequency are carried out by an electronic control module configured to generate signals for controlling a traction inverter to power the traction motor.

In one aspect, the rate of change of the excitation frequency is limited when at least one of a speed of the wheel or a speed of a vehicle is below a designated value.

In another embodiment, a control method (e.g., for controlling a traction motor of a vehicle) includes determining whether wheel creep of a wheel operably coupled to the traction motor exceeds a wheel creep threshold and limiting a rate of change of an excitation frequency applied to the traction motor to drive the wheel when the wheel creep exceeds the wheel creep threshold.

In one aspect, the control method also includes applying the excitation frequency to the traction motor to drive the wheel. Limiting the rate of change of the excitation frequency can include restricting the rate at which the excitation frequency can change responsive to the wheel creep of the wheel exceeding the wheel creep threshold.

In one aspect, the control method also includes applying the excitation frequency and monitoring the wheel creep of the wheel.

In another embodiment, a control method e.g., for controlling a traction motor of a vehicle) includes determining whether a wheel driven by the traction motor has accelerated away from a creep setpoint by at least a threshold and controlling an excitation frequency applied to the traction motor to reduce accelerating torque delivered by the motor to the wheel when the wheel has accelerated away from the creep setpoint by at least the threshold.

In one aspect, controlling the excitation frequency comprises limiting a rate of change of the excitation frequency.

In another embodiment, a control system (e.g., for a vehicle having a traction motor) includes first and second control modules. The first control module is configured to generate an excitation frequency of a current supplied to a traction motor of a traction motor system, based at least in part on a throttle command and a speed associated with one of the traction motor or a wheel driven by the traction motor. The second control module is configured to limit a rate of change of the excitation frequency responsive to a wheel creep of the wheel exceeding a wheel creep threshold.

In one aspect, the second control module is configured to limit the rate of change of the excitation frequency to a first rate of change value that is less than a second rate of change value sought to be applied to the traction motor by the first control module according to the wheel creep.

In one aspect, the second control module is configured to limit the rate of change of the excitation frequency in order to limit wheel creep gain of the wheel.

In one aspect, the first control module is configured to determine the wheel creep and the second control module is configured to limit the rate of change of the excitation frequency independently for each of a plurality of wheel and traction motor pairs of a vehicle.

In one aspect, the second control module is configured to limit the rate of change of the excitation frequency when at least one of a speed of the wheel or a speed of a vehicle is below a designated value.

In the appended claims, the terms "including" and "having" are used as the plain-language equivalents of the term "comprising"; the term "in which" is equivalent to "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

Although the inventive subject matter has been described above, it should be understood that the same is intended by way of illustration and example only and is not to be taken by way of limitation. Accordingly, the spirit and scope of the inventive subject matter are to be limited only by the terms of the appended claims. Moreover, while only certain features of the invention have been illustrated and described herein, many modifications and changes will occur to those of ordinary skill in the art. It is, therefore, to be understood that the appended claims are intended to cover all such modifications and changes as fall within the true spirit of the inventive subject matter.

The invention claimed is:

1. A control method comprising:
   determining, by a creep module that includes electronic hardware, wheel creep of a wheel operably coupled to a traction motor;
   comparing, by one or more control modules that includes electronic hardware, the wheel creep to an upper wheel creep threshold, the upper wheel creep threshold based on a speed at which a vehicle that includes the wheel and the traction motor is moving;

determining a limit on a rate of change of an excitation frequency of current that is applied to the traction motor to drive the wheel; and responsive to the wheel creep exceeding the upper wheel creep threshold, limiting, by the one or more control modules, the rate of change of the excitation frequency of the current that is applied to the traction motor to drive the wheel based on the wheel creep that is determined and the limit on the rate of change that is determined.

2. The method of claim 1, wherein the rate of change of the excitation frequency is limited to a first rate of change value that is less than a second rate of change value sought to be applied to the traction motor by the one or more control modules according to the wheel creep, the one or more control modules comprising at least one of a creep regulator or a torque regulator having electronic hardware.

3. The method of claim 1, wherein the wheel creep is determined by the one or more control modules at least in part based on a speed of the traction motor.

4. The method of claim 1, wherein limiting the rate of change of the excitation frequency by the one or more control modules limits wheel creep gain of the wheel.

5. The method of claim 4, wherein the wheel creep gain is limited by the one or more control modules to no more than 1.61 kilometers per hour, per second.

6. The method of claim 1, wherein the rate of change is limited by the one or more control modules to limit wheel creep gain of the wheel to no more than 1.61 kilometers per hour, per second.

7. The method of claim 1, wherein determining the wheel creep by the creep module and limiting the rate of change of the excitation frequency by the one or more control modules are carried out independently for each of plural wheels and traction motor pairs of the vehicle.

8. The method of claim 1, wherein determining the wheel creep and limiting the rate of change of the excitation frequency are carried out by one or more electronic hardware control modules that includes the creep module and the one or more control modules and that is configured to generate signals for controlling a traction inverter to power the traction motor.

9. The method of claim 1, wherein the rate of change of the excitation frequency is limited by the one or more control modules when one or more of a speed of the wheel or the speed of a vehicle is below a designated value.

10. The control method of claim 1, further comprising stopping the limiting of the rate of change of the excitation frequency of the current responsive to the one or more control modules determining that the wheel creep decreased below a lower wheel creep threshold.

11. The control module of claim 1, further comprising automatically applying a friction modifying substance to a route being traveled by the vehicle by a substance applicator onboard the vehicle responsive to the wheel creep increasing to within a designated amount of the upper wheel creep threshold during the one or more control modules limiting the rate of change of the excitation frequency of the current.

12. A control method comprising:
monitoring wheel creep of a wheel operably coupled to a traction motor;
determining, by one or more control modules that includes electronic hardware, whether the wheel creep exceeds an upper wheel creep threshold, wherein the upper wheel creep threshold changes based on a speed of a vehicle that includes the wheel and the traction motor;
determining a limit on a rate of change of excitation frequency of a current applied to the traction motor; and
limiting, by the one or more control modules, the rate of change of the excitation frequency of the current applied to the traction motor to drive the wheel responsive to the wheel creep exceeding the upper wheel creep threshold and based on the limit of the rate of change that is determined.

13. The control method of claim 12, further comprising applying the current at the excitation frequency to the traction motor to drive the wheel, wherein limiting the rate of change of the excitation frequency by the one or more control modules includes restricting the rate at which the excitation frequency can change responsive to the wheel creep of the wheel exceeding the upper wheel creep threshold.

14. The control method of claim 12, further comprising applying the current to the traction motor at the excitation frequency by an inverter and monitoring the wheel creep of the wheel.

15. A control method comprising:
determining a wheel creep of a wheel driven by a traction motor;
determining, by one or more control modules that includes electronic hardware, whether the wheel creep of the wheel driven by the traction motor has accelerated away from a creep setpoint by at least a threshold, wherein the creep setpoint changes based on changes in a speed at which a vehicle that includes the wheel and the traction motor moves;
determining a limit on a rate of change of an excitation frequency of a current that is applied to the traction motor to drive the wheel; and
controlling, by the one or more control modules, the excitation frequency of the current applied to the traction motor to reduce accelerating torque delivered by the motor to the wheel responsive to the wheel accelerating away from the creep setpoint by at least the threshold and based on the limit on the rate of change that is determined.

16. The method of claim 15, wherein controlling the excitation frequency comprises limiting, by the one or more control modules, the rate of change of the excitation frequency.

17. A control system comprising:
a first control module that includes one or more processors configured to generate an excitation frequency of a current supplied to a traction motor of a traction motor system, based at least in part on a throttle command and a speed associated with one of the traction motor or a wheel driven by the traction motor; and
a second control module that includes one or more processors configured to communicate with the first control module and to determine a wheel creep of the wheel driven by the traction motor, compare the wheel creep to an upper wheel creep threshold, determine a limit on a rate of change of the excitation frequency of the current that is supplied to the traction motor, and limit the rate of change of the excitation frequency responsive to a wheel creep of the wheel exceeding the upper wheel creep threshold and based on the limit on the rate of change, wherein the upper wheel creep threshold changes based on changes in a speed at which a vehicle that includes the wheel and the traction motor moves.

18. The system of claim 17, wherein the second control module is configured to limit the rate of change of the excitation frequency to a first rate of change value that is less than a second rate of change value sought to be applied to the traction motor by the first control module according to the wheel creep.

19. The system of claim 17, wherein the second control module is configured to limit the rate of change of the excitation frequency in order to limit wheel creep gain of the wheel.

20. The system of claim 17, wherein the first control module is configured to determine the wheel creep and the second control module is configured to limit the rate of change of the excitation frequency independently for each of a plurality of wheel and traction motor pairs of the vehicle.

21. The system of claim 17, wherein the second control module is configured to limit the rate of change of the excitation frequency responsive to one or more of a speed of the wheel or a speed of the vehicle being below a designated value.

22. The control system of claim 17, wherein the second control module also is configured to stop limiting of the rate of change of the excitation frequency of the current responsive to the wheel creep decreasing below a lower wheel creep threshold.

23. The control system of claim 17, further comprising a friction modifying system including a substance applicator configured to automatically apply a friction modifying substance to a route being traveled by the vehicle responsive to the wheel creep increasing to within a designated amount of the upper wheel creep threshold as the second control module limits the rate of change of the excitation frequency of the current.

* * * * *